United States Patent [19]

Tamai et al.

[11] Patent Number: 5,637,979
[45] Date of Patent: Jun. 10, 1997

[54] RECHARGEABLE BATTERY CHARGING METHOD AND APPARATUS

[75] Inventors: Mikitaka Tamai, Sumoto; Takaharu Ohira, Komatsushima, both of Japan

[73] Assignee: Sanyo Electric Co., Ltd., Osaka, Japan

[21] Appl. No.: 588,294

[22] Filed: Jan. 18, 1996

Related U.S. Application Data

[63] Continuation of Ser. No. 106,565, Aug. 16, 1993, abandoned.

[30] Foreign Application Priority Data

| Aug. 27, 1992 | [JP] | Japan | 4-228898 |
| Oct. 23, 1992 | [JP] | Japan | 4-286048 |
| Dec. 18, 1992 | [JP] | Japan | 4-087018 U |
| Feb. 1, 1993 | [JP] | Japan | 5-014751 |

[51] Int. Cl.$^6$ ............... H01M 10/44; H01M 10/46
[52] U.S. Cl. ............... 320/6; 320/15; 320/18; 320/23
[58] Field of Search ............... 320/15, 17, 20, 320/23, 39, 6, 7, 18, 19

[56] References Cited

U.S. PATENT DOCUMENTS

| 3,623,139 | 11/1971 | Dickerson | 320/17 X |
| 5,121,047 | 6/1992 | Goedken et al. | 320/15 X |
| 5,254,930 | 10/1993 | Daly | 320/15 |
| 5,387,857 | 2/1995 | Honda et al. | 320/17 X |

FOREIGN PATENT DOCUMENTS

| 4-183232 | 6/1992 | Japan . | |
| 9316518 | 8/1993 | WIPO | 320/19 |

*Primary Examiner*—Edward H. Tso
*Attorney, Agent, or Firm*—Wenderoth, Lind & Ponack

[57] ABSTRACT

A plurality of series connected rechargeable batteries are charged by detecting battery voltages and controlling charging current. Normal charging is performed until any one battery voltage reaches a prescribed voltage. After any one battery voltage reaches the prescribed voltage, all batteries are charged such that a charging current is controlled to keep each battery voltage from exceeding the prescribed voltage.

14 Claims, 16 Drawing Sheets

RECHARGEABLE BATTERY CHARGING METHOD AND APPARATUS

This application is a Continuation of now abandoned application, Ser. No. 08/106,565, filed Aug. 16, 1993.

BACKGROUND OF THE INVENTION

This invention relates to a method and apparatus for charging a plurality of rechargeable batteries connected in series, and more particularly to a charging method suited to nonaqueous rechargeable batteries.

The rechargeable battery, which can be repeatedly charged and reused, suffers a severely degraded performance when it is over-charged. Therefore, in the case of one rechargeable battery, the lithium ion rechargeable battery, charging begins with constant current charging and switches to constant voltage charging when the voltage approaches a prescribed value. This shortens charging time and prevents over-charging. Since over-charging does not occur when battery voltage is low, the battery is quickly charged with a fixed current until the prescribed battery voltage is approached. Charging is then switched from constant current to constant voltage to prevent over-charging. If the battery were charged with constant voltage from the beginning, enormous charging currents would flow in the early stages of charging. On the other hand, if constant current charging were continued to the end, over-charging would easily become a problem.

This type of battery charging method that begins with constant current charging followed by constant voltage charging is described in Japanese Patent Disclosure 4-183232 (1992). This charging method is realized by the circuit shown in FIG. 1.

The battery charger shown in this figure charges the rechargeable battery B in the following manner. First, at the beginning of charging when the voltage of the rechargeable battery B is low, the output of operational amplifier (op-amp) 1 is positive (+). This is because the voltage at the non-inverting (+) input terminal of the op-amp is higher than that at the inverting (−) input terminal. Consequently, the base of transistor TR1 does not get connected to ground through the op-amp 1, and the series connected battery B is charged by the constant current charging circuit made up of transistors TR1 and TR2.

As the rechargeable battery B becomes fully charged and its voltage rises, the output voltage of the op-amp goes negative (−). Due to this, the base of transistor TR1 is connected to ground through the op-amp 1 turning transistor TR1 off.

When the rechargeable battery B voltage is below the prescribed reference voltage, the output voltage of the op-amp is (+) and transistor TR1 conducts to charge the battery. In other words, in this fashion the battery is charged without exceeding a fixed voltage (constant voltage charging).

In the case where a plurality of batteries connected in series are charged using the battery charger shown in FIG. 1, balanced charging of each battery can be accomplished if the capacity and internal resistance of all the batteries always remains the same. In actuality there is some variation in battery capacity and internal resistance. Further, even when internal resistance is initially the same, the internal characteristics and internal resistance change as the battery progresses through many charging cycles. As a result, the balance between each battery in a series connection is destroyed and over-charging occurs.

For example, a lithium ion rechargeable battery becomes fully charged at 4.2 V. When two lithium ion rechargeable batteries are charged in a series connection, properly operating batteries can be fully charged by setting the reference voltage for constant voltage charging at 8.4 V. However, if the battery capacity of the two batteries is not the same, one battery can be at 4.5 V while the other battery can be 3.9 V. In this case, the rechargeable battery with a voltage up to 4.5 V has been over-charged and its performance will be severely degraded.

Further, in the case where the internal resistance of the two batteries is not the same battery voltage during charging will rise more for the battery with larger internal resistance since the charging voltage (equal to the charging current times the internal resistance) is greater for that battery, and the high internal resistance battery will be over-charged. The internal resistance of this battery will further increase with each charging resulting in further over-charging and performance reduction.

Still further, nonaqueous rechargeable batteries such as the lithium ion rechargeable battery produce gas from a secondary reaction that dissociates the electrolyte when the prescribed voltage is exceeded and over-charging occurs. This increases the battery internal pressure as well as degrading performance. This internal pressure increase can cause the tightly sealed lithium ion rechargeable battery casing to burst. For these reasons the detrimental effects of nonaqueous rechargeable battery over-charging are extremely serious and prevention of over-charging is extremely important.

The present invention was developed considering the above mentioned points. It is thus the object of the present invention to provide a rechargeable battery charging method and apparatus that can charge each of a plurality of rechargeable batteries connected in series close to full charge without over-charging and with superior charge-discharge cycling characteristics.

The above and further objects and features of the invention will more fully be apparent from the following detailed description with accompanying drawings.

SUMMARY OF THE INVENTION

The battery charging method and apparatus of this invention regulates charging current when charging a plurality of rechargeable batteries connected in series such that each battery is charged normally until a prescribed reference voltage is reached and battery voltage is kept below the reference voltage after any battery reaches the reference voltage. The battery charging method and apparatus of this invention performs rapid charging with constant current, with current and voltage regulated within prescribed ranges, or with pulses until a reference voltage corresponding to the smallest capacity rechargeable battery is reached. Subsequently, when the voltage of the small capacity battery reaches the reference voltage, charging current is regulated to keep that battery voltage from exceeding the reference voltage.

DETAILED DESCRIPTION OF THE INVENTION

Figure 3:
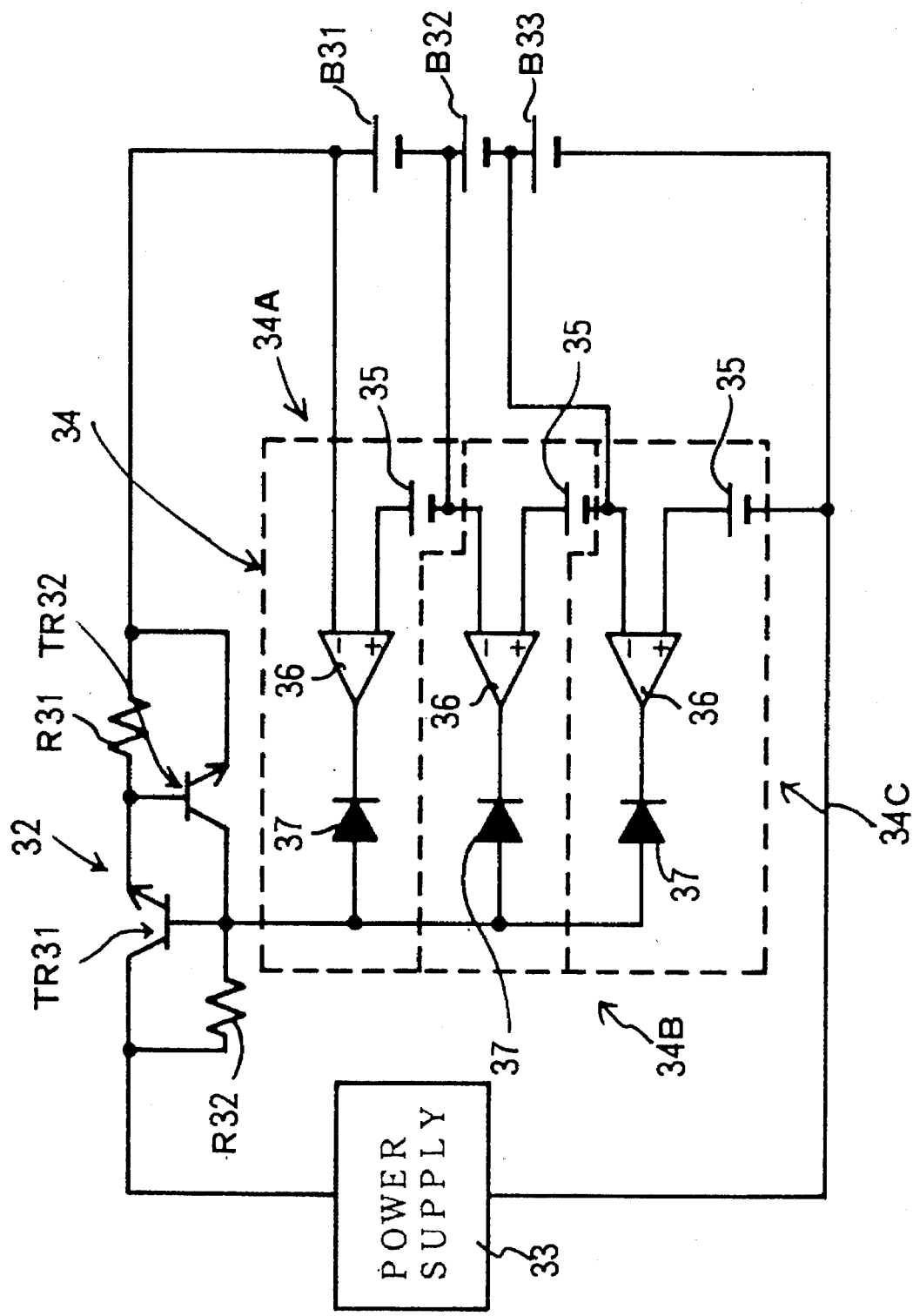
FIG. 3 is a circuit diagram of the battery charging circuit of the first embodiment of the present invention.

Turning to FIG. 3, a circuit diagram of the battery charger of the first embodiment of the present invention is shown. FIG. 3 shows an example of a circuit for charging three nonaqueous rechargeable batteries B31, B32, and B33. This charging circuit is provided with a power supply 33 for battery charging, a constant current charging circuit 32 that is the controlling means for regulating charging current to the rechargeable batteries B31, 832, and 833, and a constant voltage charging circuit 34 that is the voltage detection circuit for sensing rechargeable battery B31, B32, and B33 voltages and detecting if each battery voltage exceeds the reference voltage.

The constant current charging circuit 32 is made up of two transistors TR31 and TR32, and two resistors R31 and R32. The battery charging current of this constant current charging circuit 32 is adjusted to make the voltage drop across the resistor R31 connected in series with the emitter of transistor TR31 equal to 0.6 V. Consequently, the charging current I is I=0.6 V/R1. The constant current charging circuit 32 operates in the following manner to charge the rechargeable batteries B31, B32, and B33 with constant current.

When the charging current to the rechargeable batteries B31, B32, and B33 increases, the voltage drop across resistor R31 increases causing the base current in transistor TR32 to increase. This is because the base-emitter voltage of transistor TR32 increases.

When the base current in transistor TR32 increases, the emitter-collector resistance of transistor TR32 decreases, and the voltage at the base of transistor TR3 drops. Therefore, the emitter-collector resistance of transistor TR31 increases reducing the charging current to the rechargeable batteries B31, B32, and B33.

On the other hand, when the charging current to the rechargeable batteries B31, B32, and B38 decreases, the emitter-collector resistance of transistor TR81 decreases causing the charging current to increase. Consequently, this constant current charging circuit 32 regulates the voltage drop across resistor R31 to a constant voltage, or in other words, it regulates charging current to a constant value.

The constant voltage charging circuit 34 detects the battery voltage of the rechargeable batteries B31, B32, and B33 and controls the constant current charging circuit to regulate current to the rechargeable batteries. The constant voltage charging circuit 34 is provided with a set of three current regulating circuits 34A, 34B, and 34C connected to each of the three rechargeable batteries B31, B32, and B33 to regulate charging current with each detected battery voltage.

Each of the current regulating circuits 34A, 34B, and 34C is provided with an op-amp 36, a voltage reference device 35, and a diode 37. The inverting (−) input terminal of each op-amp is connected to the positive (+) terminal of the rechargeable batteries B31, B32, and B33 and the non-inverting (+) input terminal of each op-amp is connected to a voltage reference device 35. The output terminal of each op-amp is connected through a diode 37 to the base of transistor TR31. Each voltage reference device 35 is adjusted to the prescribed battery voltage (E). In the case where the rechargeable batteries B31, B32, and B33 are lithium ion rechargeable batteries, the voltage of each voltage reference device 35 is set, for example, to 4.2 V. The diode 37 is connected to allow current to flow only in a direction from the base of transistor TR31 to the op-amp 36.

Figure 1:
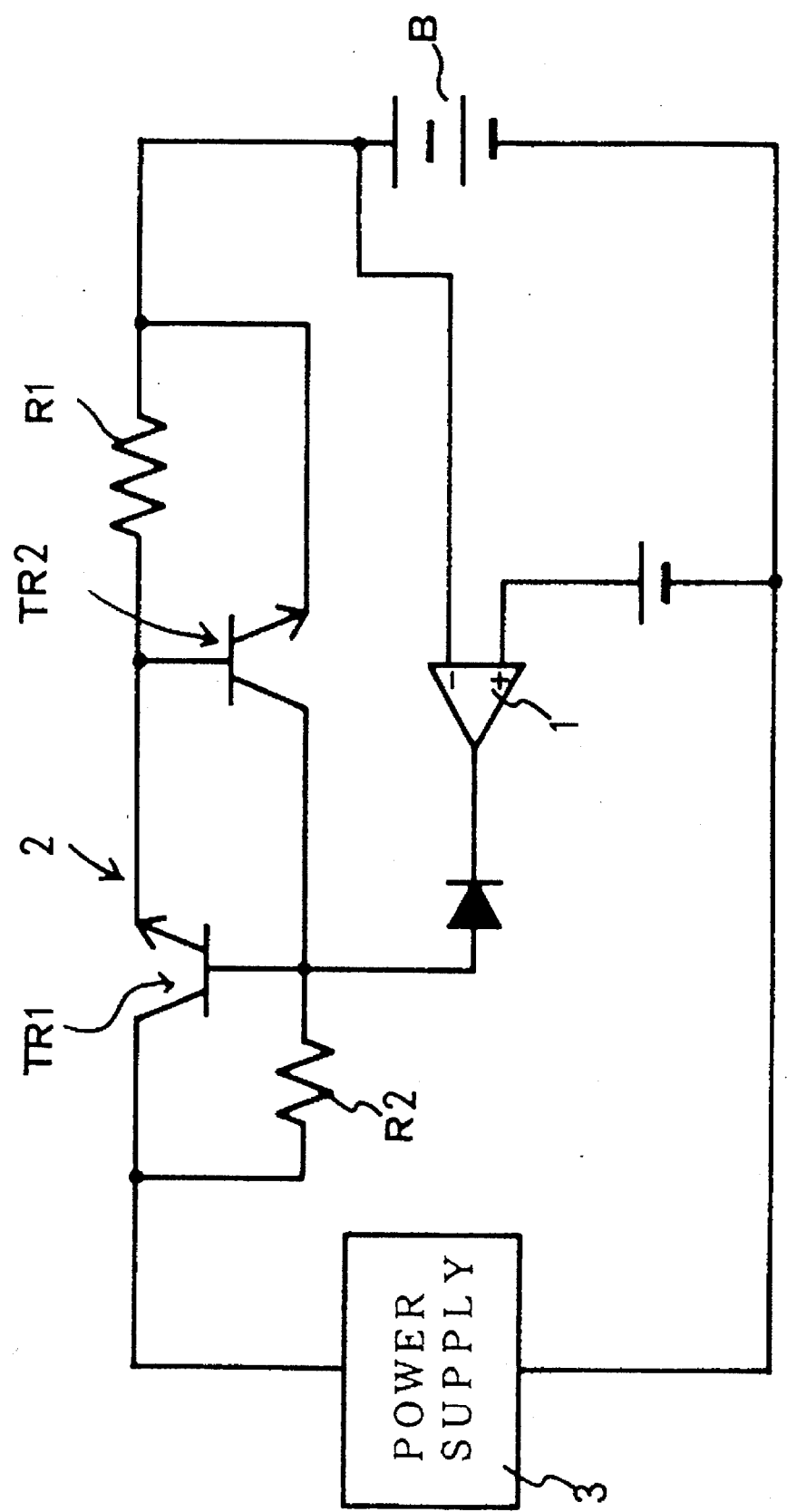
FIG. 1 is a circuit diagram of a nonaqueous rechargeable battery charging circuit for a prior art method.
Figure 2:
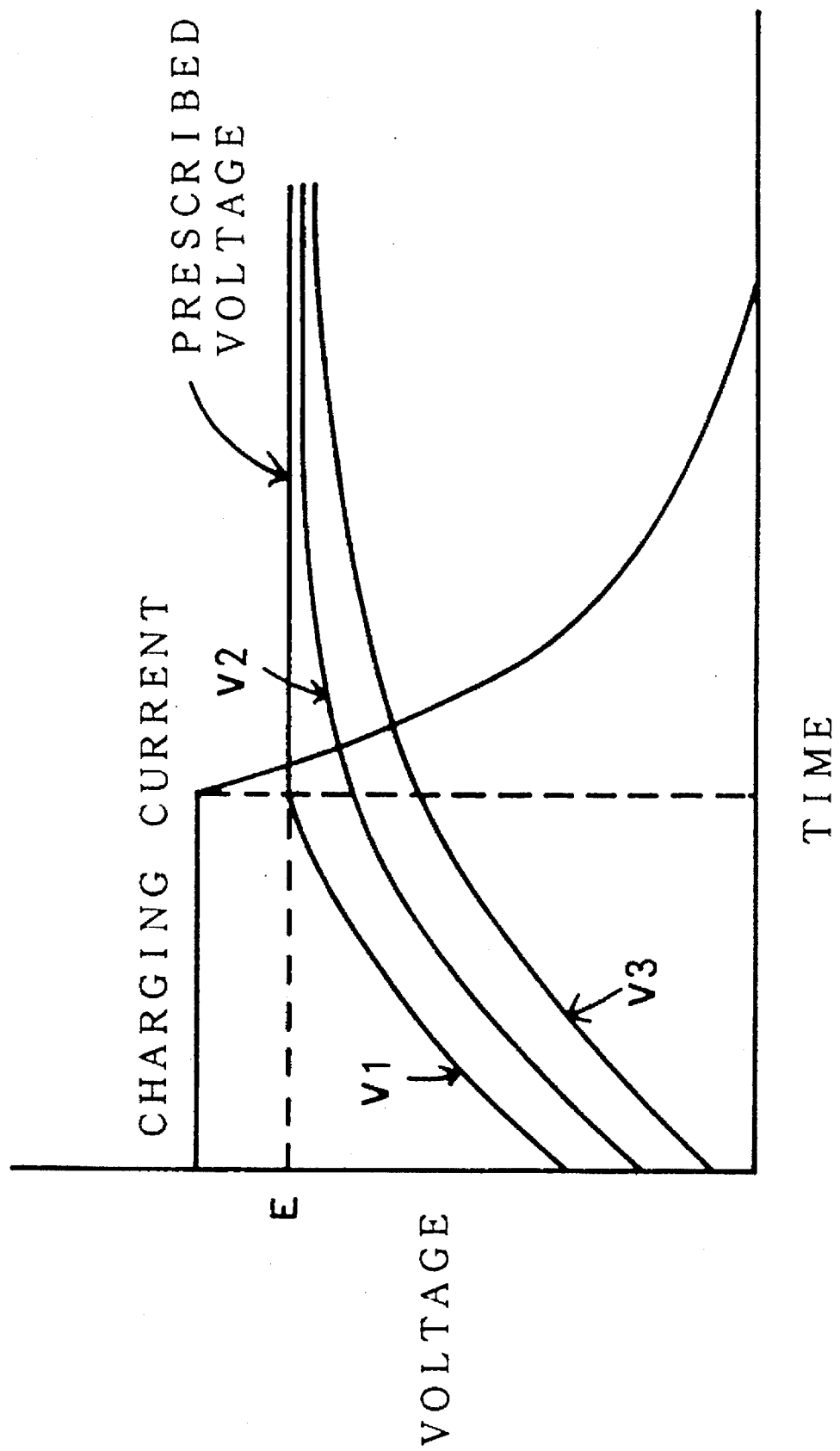
FIG. 2 is a graph showing nonaqueous rechargeable battery charging voltage and current characteristics for the method of the present invention.

The current regulating circuits 34A, 34B, and 34C regulate charging current to keep the voltage of each rechargeable battery B31, B32, and B33 from rising above the reference voltage in the following manner. When the battery voltage V1, V2, and V3 of each rechargeable battery B31, B32, and B33 is below the prescribed voltage (E) of each voltage reference device 35, the voltage at the (+) input terminal of each op-amp is higher than that at the (−) input terminal, and the resulting output of each op-amp is (+). If the output of an op-amp 36 is (+), the diode 37 is reverse biased and current is not drawn from the base of transistor TR31. In other words, the constant current charging circuit 32 is not influenced by the current regulating circuits 34A, 34B, and 34C and it charges the rechargeable batteries B31, B32, and B33 with a fixed current. In FIG. 2 and FIG. 3, this situation continues until any of the voltages V1, V2, and V3 of the rechargeable batteries B31, B32, and B33 reach the reference voltage (E).

As shown in FIG. 2, when the voltage V1 of rechargeable battery B31 reaches the reference voltage (E), the output voltage of the op-amp 36 of the current regulating circuit 34A of FIG. 3 goes to zero (however, the output voltages of the op-amps 36 of the current regulating circuits 34B and 34C remain (+) and do not go to zero). Therefore, current is drawn from the base of transistor TR31 through the diode 37 into the op-amp 36 of the current regulating circuit 34A.

As a result, the base current of transistor TR31 decreases, the emitter-collector resistance of transistor TR31. Increases, and the charging current decreases. Namely, the charging current controlled by transistor TR31 is regulated to keep the voltage V1 of rechargeable battery B31 from exceeding the reference voltage (E). This is because when the voltage V1 of the rechargeable battery B31 exceeds the reference voltage, the current regulating circuit 34A reduces the base current of transistor TR31. When charging current is reduced, the voltage V1 of rechargeable battery B31 drops, and although charging current again increases, the voltage V1 of rechargeable battery B31 is regulated not to exceed the prescribed reference voltage (E).

In accordance with the operation described above and as shown in FIG. 2, charging current gradually decreases but does not become zero. Therefore, the voltages V2 and V3 of the remaining two rechargeable batteries B32 and B33 gradually rise and approach the reference voltage (E).

Figure 4:
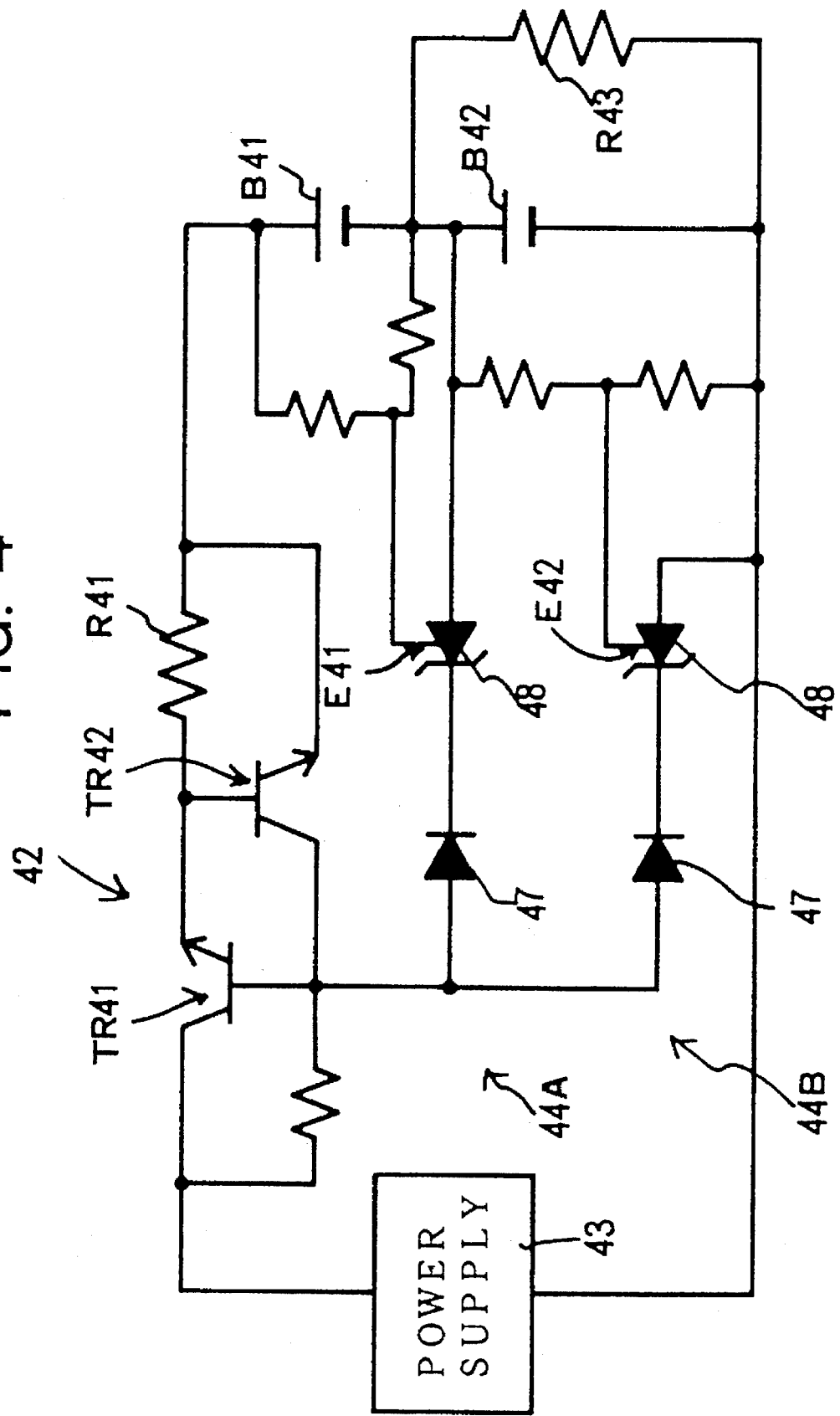
FIG. 4 is a circuit diagram of the battery charging circuit of the second embodiment of the present invention.

Turning now to FIG. 4, the second embodiment of the present invention is shown. This battery charging circuit charges two nonaqueous rechargeable batteries B41 and B42, and each current regulating circuit 44A and 44B is provided with a shunt regulator integrated circuit (IC) 48. The shunt regulator IC 48 is used in place of the op-amp 36 and voltage reference device 35 of the current regulating circuits shown in FIG. 3. The characteristics of the shunt regulator IC 48 are such that internal resistance becomes extremely low when the input voltage is 2.5 V or greater and extremely high when the input voltage is below 2.5 V. A voltage divider from each rechargeable battery B41 and B42 inputs voltage to the voltage detection terminals E41 and E42 of each shunt regulator IC 48. The voltage divider ratio is designed such that each shunt regulator IC 48 input voltage becomes 2.5 V when each rechargeable battery B41 and B42 voltage reaches the prescribed reference voltage (E).

When the voltage of either of the rechargeable batteries B41 or B42 rises to the reference voltage, the shunt regulator IC 48 of the current regulating circuit 44A or 44B that is connected to the battery that reached the reference voltage has its internal resistance decrease radically. When the shunt regulator IC 48 internal resistance drops, the base current of transistor TR41 of the constant current charging circuit 42 drops, and battery voltage is regulated to keep it from exceeding the reference voltage. Namely, the current regulating circuits 44A and 44B shown in this figure operate in the same manner as the first embodiment to charge the rechargeable batteries B41 and B42 without allowing either of their voltages to exceed the reference voltage.

In this circuit, a resistor R43 in parallel with the ground connected battery is provided to divide current and establish a path to ground for current passing through the shunt regulator IC 48 of current regulating circuit 44A.

Figure 5:
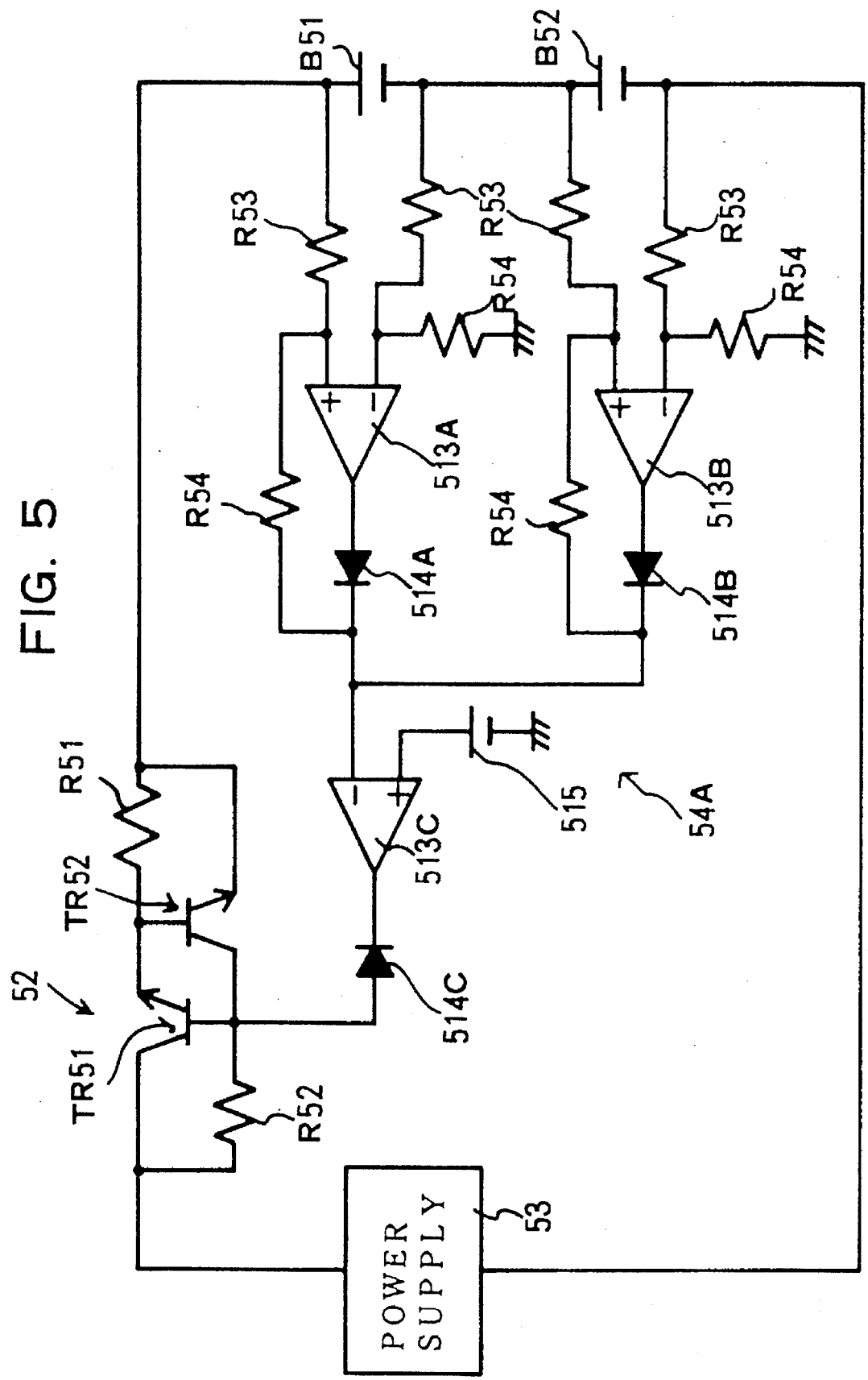
FIG. 5 is a circuit diagram of the battery charging circuit of the third embodiment of the present invention.

Turning now to FIG. 5, the third embodiment of the present invention is shown. This battery charging circuit charges two nonaqueous rechargeable batteries B51 and B52. The current regulating circuit 54A is made up of three op-amps 513A, 513B, and 513C, three diodes 514A, 514B, and 514C, and one voltage reference device 515. All the resistors R53 and R54 on the op-amps 513A and 513B have respective equal values. Op-amp 513A has the (+) terminal of rechargeable battery B51 connected to its (+) input terminal and the (−) terminal of rechargeable battery B51 connected to its (−) input terminal. Op-amp 513B has the (+) terminal of rechargeable battery B52 connected to its (+) input terminal and the (−) terminal of rechargeable battery B52 connected to its (−) input terminal. Further, the output terminals of op-amps 513A and 513B are connected to the (−) input terminal of op-amp 513C through diodes 534A and 514B. The voltage reference device 515 is adjusted to the reference voltage (E) of the rechargeable batteries B51 and B52, and is connected to the (+) input terminal of op-amp 513C. Finally, the output terminal of op-amp 513C is connected to the base of transistor TR51 through the diode 514C.

In this current regulating circuit 54A, the op-amps 513A and 513B output the voltages V1 and V2 of the rechargeable batteries B51 and B52 respectively, and the larger voltage of V1 and V2 is input to the (−) input terminal of op-amp 514C. In other words, when the voltage of either rechargeable battery B51 or B52 reaches the reference voltage (E), that voltage is input to the (−) input terminal of op-amp 514C.

Consequently, when the voltage of either rechargeable battery B51 or B52 rises to the reference voltage (E), the output voltage of op-amp 513C drops to zero. When this occurs, the base current of transistor TR51 of the constant current charging circuit 52 decreases, and battery voltage is regulated not to exceed the reference voltage. Namely, the current regulating circuit 54A shown in this figure operates in the same manner as the previous embodiment to charge the rechargeable batteries B51 and B52 without allowing either of their voltages to exceed the reference voltage.

In the present invention, in order to detect each battery's voltage and regulate charging current in the manner described above, voltage detection terminals are provided from the (+) and (−) connection points of the series connected rechargeable batteries.

Figure 6:
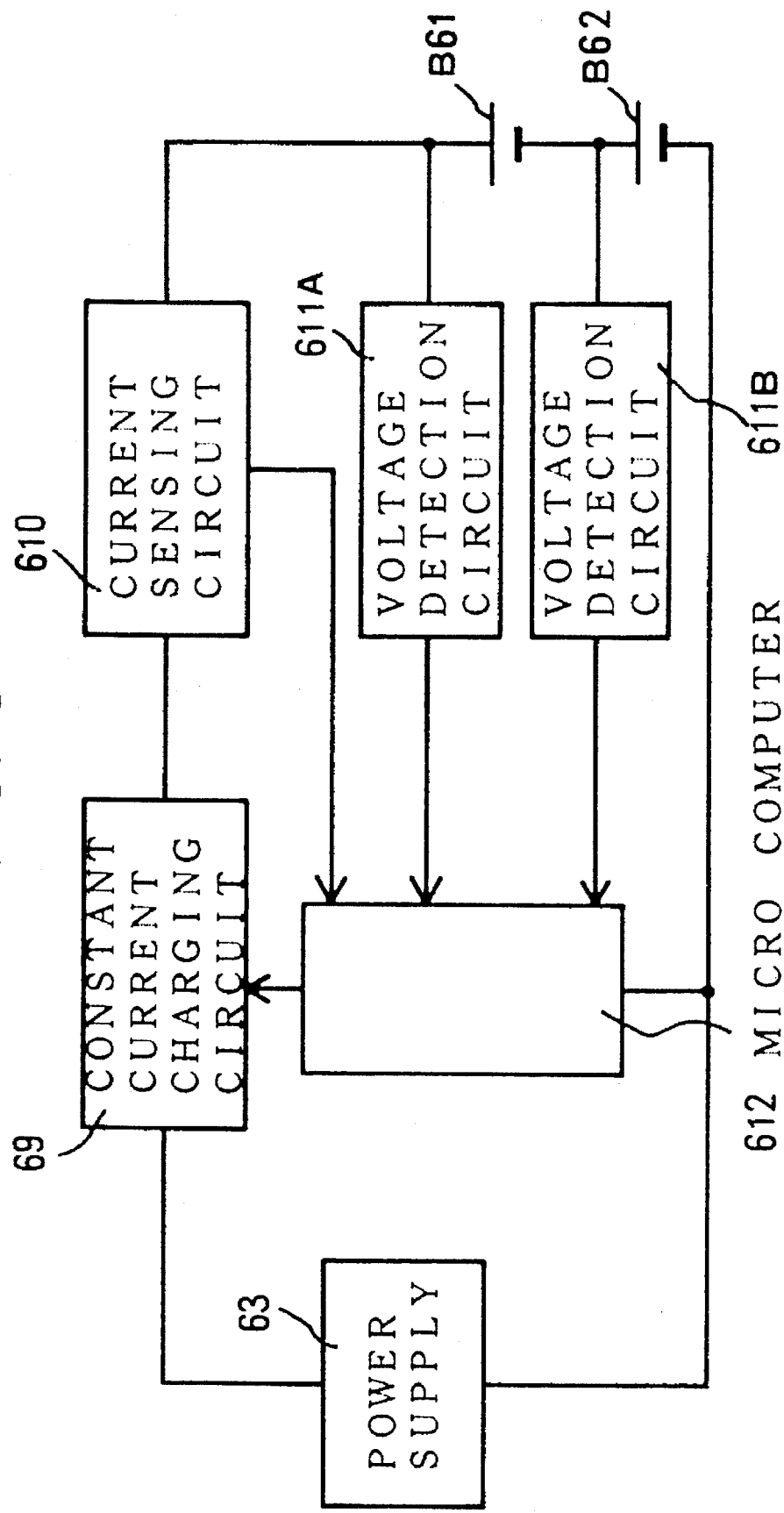
FIG. 6 is a circuit diagram of the battery charging circuit of the fourth embodiment of the present invention.

Turning to FIG. 6, the fourth embodiment of the present invention is shown. This circuit controls charging current with a microcomputer to charge two nonaqueous rechargeable batteries B61 and B62.

Figure 7:
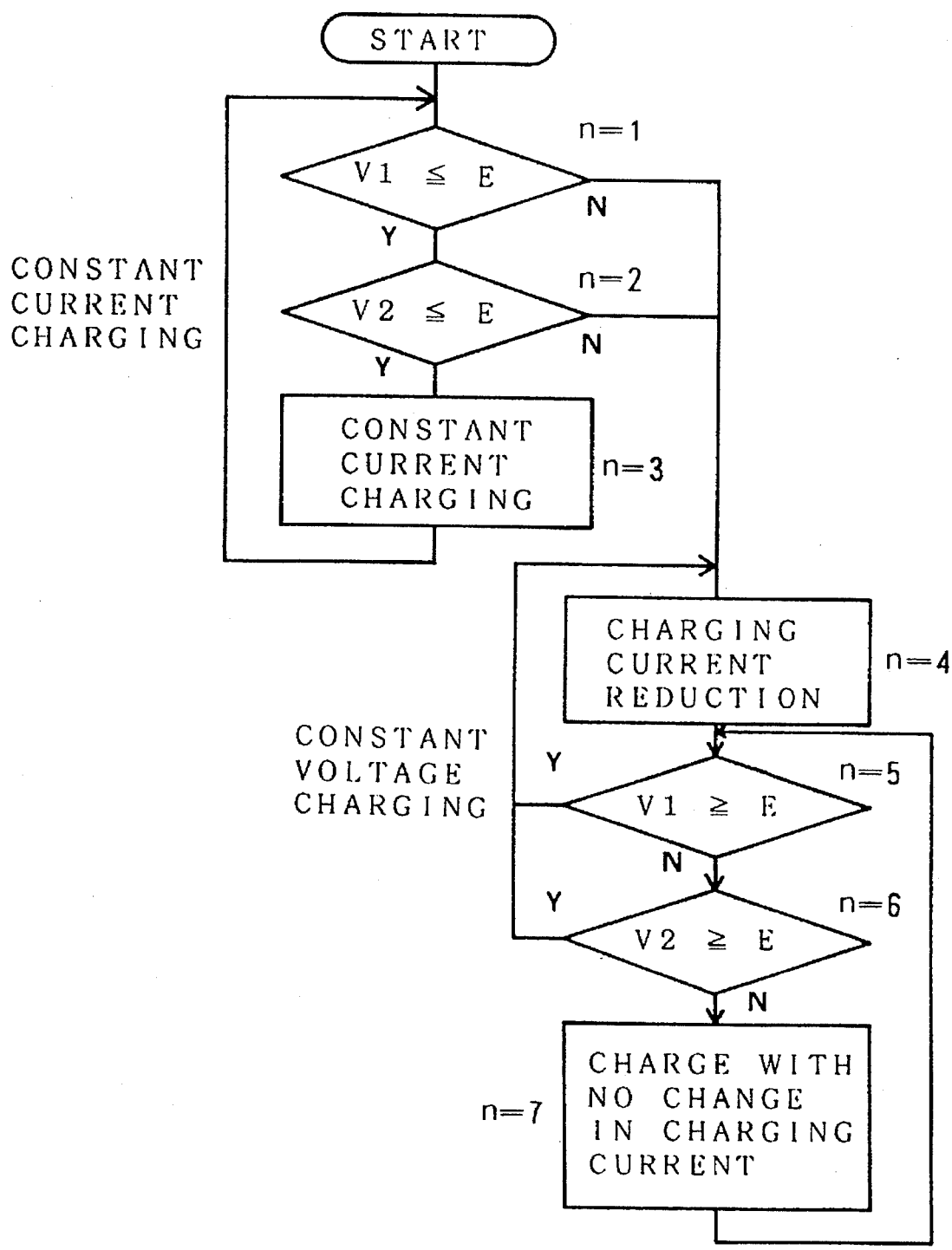
FIG. 7 is a flow-chart of nonaqueous rechargeable battery charging by the method of the present invention using the charging circuit shown in FIG. 6.

This battery charging circuit comprises a power supply 63, a constant current charging circuit 69, a current sensing circuit 610, voltage detection circuits 611A and 611B, and a microcomputer 612. The control means to control charging current to the rechargeable batteries of this circuit is made up of the constant current charging circuit 69. The control means to control the constant current charging circuit 69 and in turn control the charging current is made up of the microcomputer 612 and the voltage detection circuits 611A and 611B. The current sensing circuit 610 samples charging current at a fixed periodic interval and inputs that value to the microcomputer 612. The voltage detection circuits 611A and 611B sample the voltages of the rechargeable batteries B61 and B62 respectively at fixed periodic intervals and input those values to the microcomputer 612. The microcomputer 612 processes the input current and voltage signals and charges the batteries according to the flow-chart of FIG. 7 as follows.

In step n=1, the microcomputer 612 and the voltage detection circuit 611A determine whether or not the voltage V1 of the rechargeable battery B61 is below the reference voltage (E).

In step n=2, if the battery voltage V1 is below the reference voltage (E), the microcomputer 612 and the voltage detection circuit 611B determine whether or not the voltage V2 of the rechargeable battery B62 is below the reference voltage (E).

In step n=3, if the battery voltage V2 is also below the reference voltage (E), constant current charging is performed. After constant current charging, control loops back to step n=1. By this procedure, the rechargeable batteries B61 and B62 are constant current charged until the voltage V1 or V2 of either rechargeable battery exceeds the reference voltage (E).

In step n=4, when either voltage V1 or V2 of the rechargeable batteries B61 and B62 exceeds the reference voltage, the charging current is reduced.

In step n=5, after reducing the charging current, it is judged whether or not the voltage V1 of the rechargeable battery B61 is above the reference voltage (E). If the battery voltage V1 exceeds the reference voltage (E), control loops back to step n=4 for further charging current reduction.

In step n=6, if the voltage V1 of the rechargeable battery B61 is not above the reference voltage (E), it is judged whether or not the voltage V2 of the rechargeable battery B62 is above the reference voltage (E). If the battery voltage V2 exceeds the reference voltage (E), control loops back to step n=4 for further charging current reduction.

In step n=7, if neither voltage V1 or V2 of the rechargeable batteries B61 and B62 exceeds the reference voltage, charging is performed without increasing or decreasing the current. After this control loops back to step n=5.

In steps n=4 to n=7, each rechargeable battery B61 and B62 is charged while charging current is adjusted to avoid either voltage V1 or V2 of the batteries B61 and B62 from exceeding the reference voltage.

In the charging apparatus above, the voltage of each battery connected in series is detected, and if any battery's voltage rises to the reference voltage, charging current is regulated to keep that battery voltage from exceeding the reference voltage. In other words, If the voltage of a small capacity battery reaches the reference voltage very early, charging is continued while reducing the charging current to limit the voltage of that battery below the reference voltage. Consequently, charging can be performed such that the voltage of a small capacity battery does not exceed the prescribed reference voltage and the other batteries approach full charge. For this reason, this charging apparatus can fully charge rechargeable batteries even when connected in series without causing the voltage on any individual battery to rise abnormally high, that is without causing battery performance degradation due to secondary reactions such as electrolyte dissociation.

In a charging method like that described above, where each battery's voltage is detected to regulate charging current, it is possible, due to unreliable contact to the voltage detection terminals for example, that each battery's voltage cannot be detected. In this case, it is best to measure the total voltage of the batteries or the battery pack voltage and regulate charging current to keep this voltage from exceeding a prescribed reference voltage.

Figure 8:
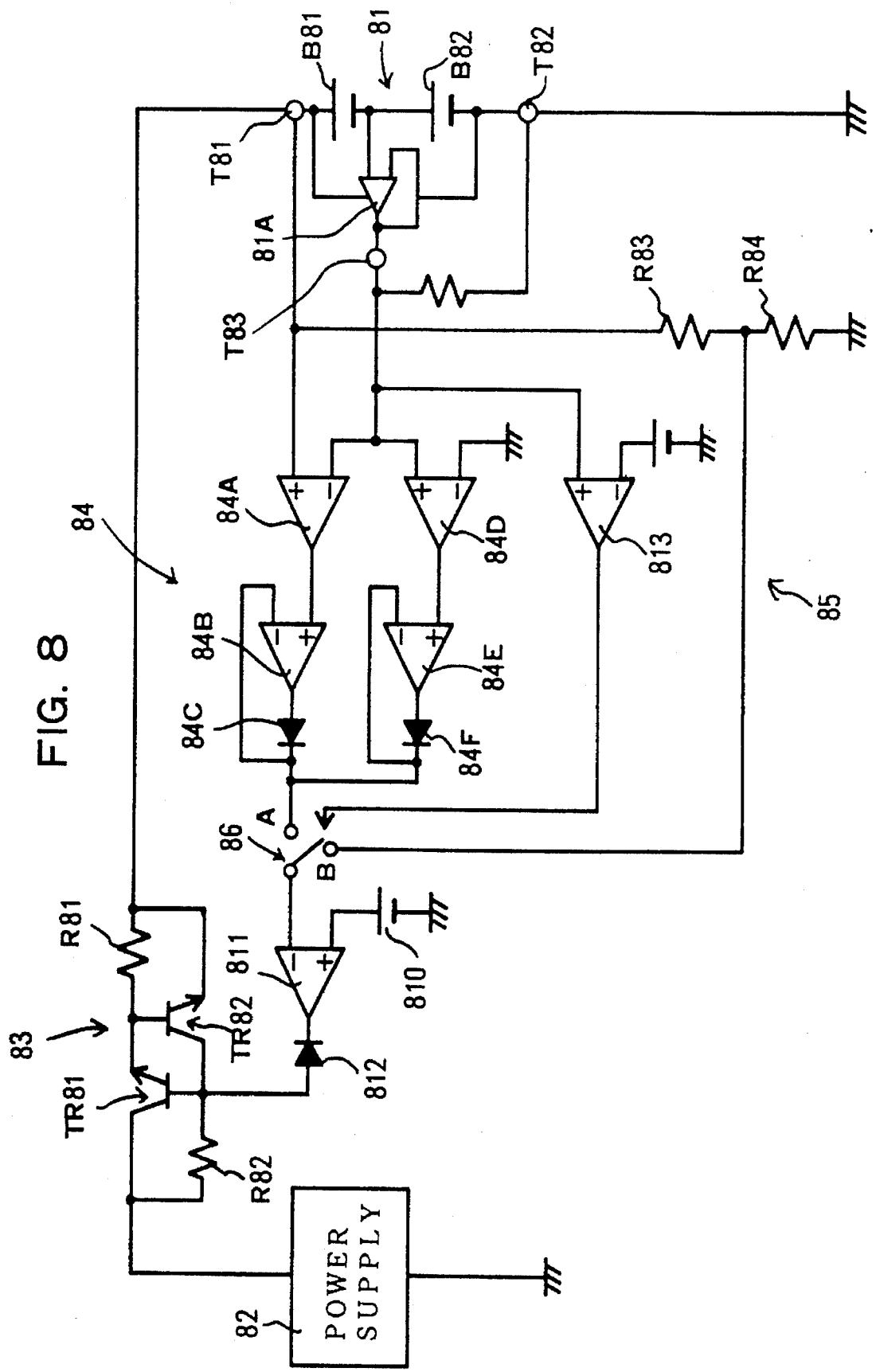
FIG. 8 is a circuit diagram showing the battery charging circuit of the fifth embodiment of the present invention.

FIG. 8 is a circuit diagram of the fifth embodiment of the present invention. The circuit shown in this figure charges a battery pack 81. containing two rechargeable batteries B81 and B82. This battery charging circuit is provided with a power supply 82 for battery charging, a constant current charging circuit 83 to regulate charging current to the rechargeable batteries B81 and B82, a first constant voltage charging circuit 84 to detect the voltage of each rechargeable battery B81 and B82 and keep battery voltage from exceeding the reference voltage, a second constant voltage charging circuit 85 to detect the total voltage across the rechargeable batteries B81 and B82 and keep battery voltage from exceeding a prescribed voltage (twice the reference voltage= 2E), and a switching device 86 to choose either the first constant voltage charging circuit 84 or the second constant voltage charging circuit 85.

The battery pack 81 contains two nonaqueous rechargeable batteries B81 and B82 connected in series. Further, there are two types of battery packs. There are battery packs 81 (three terminal battery packs), as shown in FIG. 8, with charging terminals T81. and T82 at both ends of the series connected rechargeable batteries B81 and B82 and a voltage detection terminal T83. There are also two terminal battery packs (not illustrated) with charging terminals T81 and T82 only. The three terminal battery pack is provided with a buffer 81A from the midpoint between the rechargeable batteries B81 and B82 to the voltage detection terminal 83.

The first constant voltage charging circuit 84 detects the voltage of each rechargeable battery B81 and B82 to regulate charging current. The first constant voltage charging circuit 84 is made up of two stages of op-amps 84A and 84B that detect and output the voltage of one rechargeable battery B81, a diode 84C connected to the output terminal of op-amp 84B, two stages of op-amps 84D and 84E that detect and output the voltage of the other rechargeable battery B82, a diode 84F connected to the output terminal of op-amp 84E, an op-amp 811 that compares the inverting input from the diodes 84C and 84F through the switching device 86 with the reference voltage (prescribed reference voltage E) of the reference voltage device 810 at the non-inverting input, and a diode 812 connected between the output terminal of op-amp 811. and the base of transistor TR81.

The second constant voltage charging circuit 85 detects the total voltage across the rechargeable batteries B81 and B82 and regulates charging current. The second constant voltage charging circuit 85 is made up of two voltage dividing resistors R83 and R84 that divide the total battery voltage across the rechargeable batteries B81 and B82 in half, op-amp 811 that compares the output of the voltage divider through the switching device 86 with the prescribed voltage (E) of the reference voltage device 810, and diode 812. In other words, the second constant voltage charging circuit 85 shares the use of the reference voltage device 810, the op-amp 811, and the diode 812 with the first constant voltage charging circuit 84.

The switching device 86 selects charging current regulation using either the first constant voltage charging circuit 84 or the second constant voltage charging circuit 85. The switching device 86 switches in response to output from a comparator 813 that determines whether or not battery voltage is output from the voltage detection terminal T83 of the battery pack 81. Specifically, if the connecting point voltage between the rechargeable batteries B81 and B82 is output from the voltage detection terminal T83 and the comparitor 813 detects that, the switching device 86 is connected in position A (the first constant voltage charging circuit 84), and if the connecting point voltage is not detected, the switching device 86 is connected in position B (the second constant voltage charging circuit 85).

Figure 9:
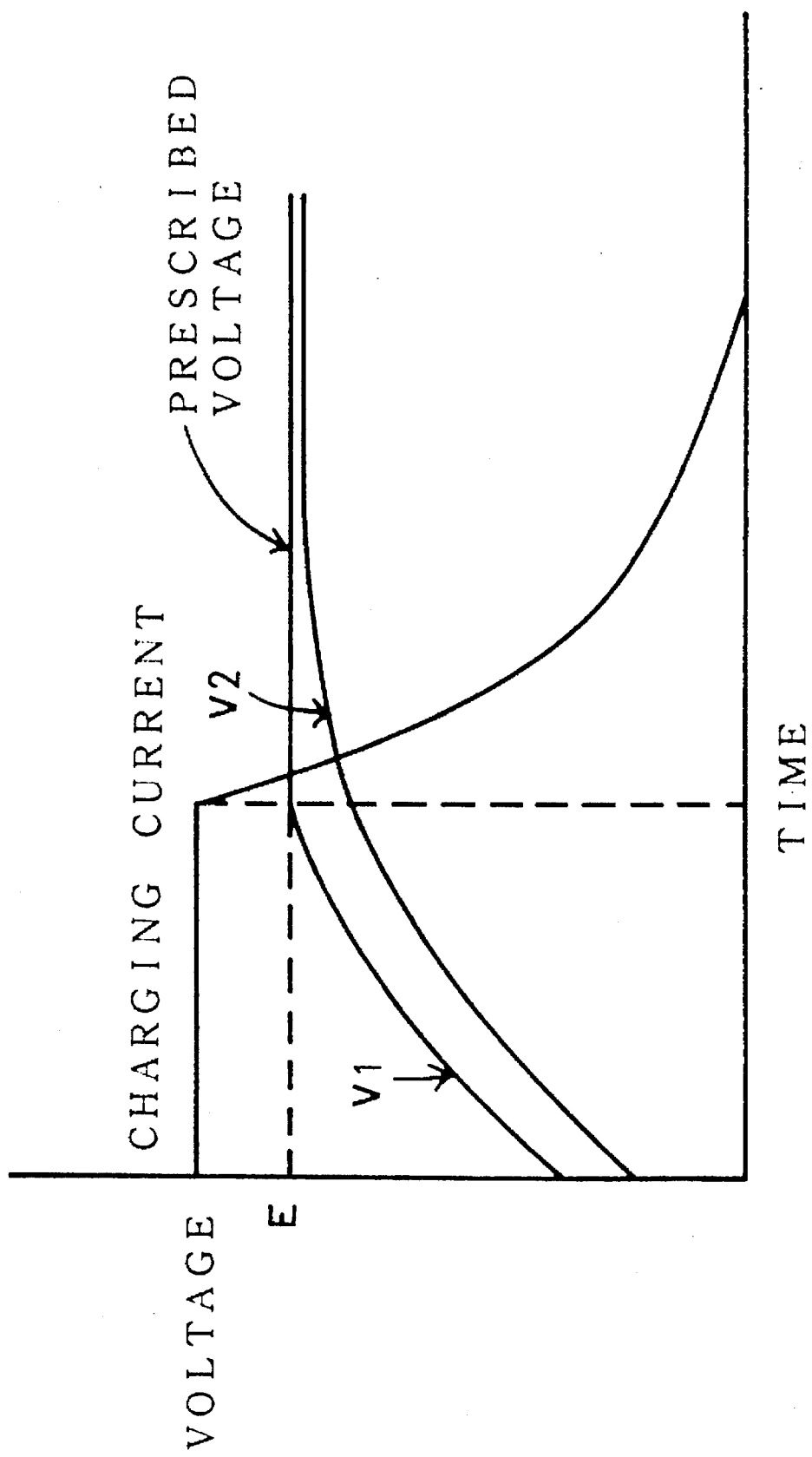
FIG. 9 is a graph showing nonaqueous rechargeable battery charging voltage and current characteristics for the method of the present invention using the battery charging circuit shown in FIG. 8.

When this circuit charges a three terminal battery pack (namely, battery pack 81 of FIG. 8), the comparator 813 detects battery voltage output from the voltage detection terminal T83 and the switching device 86 is connected to position A Consequently, the first constant voltage charging circuit 84 regulates charging current, as shown in FIG. 9 and described below, such that the voltage of neither rechargeable battery B81 or B82 exceeds the reference voltage.

The op-amps 84B and 84E output the voltages V1 and V2 of the rechargeable batteries B81 and B82 respectively. The larger of the two voltages V1 and V2 of the rechargeable batteries B81 and B82 is input to the (−) input of the op-amp 811. In other words if either of the voltages of the rechargeable batteries B81 and B82 has reached the reference voltage (E), that voltage is input to the (−) input of the op-amp 811.

If both voltages V1 and V2 of the rechargeable batteries B81 and B82 are below the reference voltage of the reference voltage device 810, the output of the op-amp 811 is (+). When the op-amp 811 output is (+), the diode 812 is reverse biased, and current is not drawn from the base of transistor TR81. Therefore, the constant current charging circuit 83 is not influenced by the first constant voltage charging circuit 84, and it charges all the rechargeable batteries B81 and B82 with fixed current. Referring to FIG. 9, this situation continues until either voltage V1 or V2 of the rechargeable batteries B81 and B82 reaches the reference voltage (E).

When the voltage V1 of rechargeable battery B81 reaches the reference voltage (E), the output voltage of op-amp 811 goes to zero. The base current of transistor TR81 is then drawn into the op-amp 811 through the diode 812.

As a result, base current of transistor TR81 decreases, emitter-collector resistance of transistor TR81 increases, and charging current decreases. In other words, charging current controlled by transistor TR81 is regulated to keep the voltage V1 of the rechargeable battery B81 from exceeding the reference voltage (E). When charging current decreases, the voltage V1 of the rechargeable battery B81 drops, and although charging current is again increased, it is regulated to keep the voltage V1 of the rechargeable battery B81 from exceeding the reference voltage (E).

As shown in FIG. 9, charging current is gradually decreased by the operation described above. However, since the charging current does not become zero, the voltage V2 of the remaining rechargeable battery B82 gradually increases approaching the reference voltage (E).

On the other hand, in the case of charging a two terminal battery pack or in the case of charging a three terminal battery pack when for some reason battery voltage is not output from the voltage detection terminal T83, the comparator 813 does not detect battery voltage from the voltage detection terminal T83, and the switching device 86 is connected in position B. Therefore, the rechargeable batteries B81 and B82 are charged under control of the second constant voltage charging circuit 85.

In the second constant voltage charging circuit 85, the total voltage oF both rechargeable batteries B81 and B82 is divided in half by voltage divider resistors R83 and R84, and that voltage is output to the op-amp 811 through the switching device 86.

When the total voltage of both rechargeable batteries B81 and B82 is below the prescribed voltage (2E), the output of op-amp 811 is (+). However, when the total voltage of both rechargeable batteries B81 and B82 reaches the prescribe voltage (2E), the output voltage of op-amp 811 goes to zero. In the same fashion as described above, charging current is controlled by the output voltage of op-amp 811 to keep the total voltage of both rechargeable batteries B81 and B82 from exceeding the prescribed voltage (2E).

Figure 10:
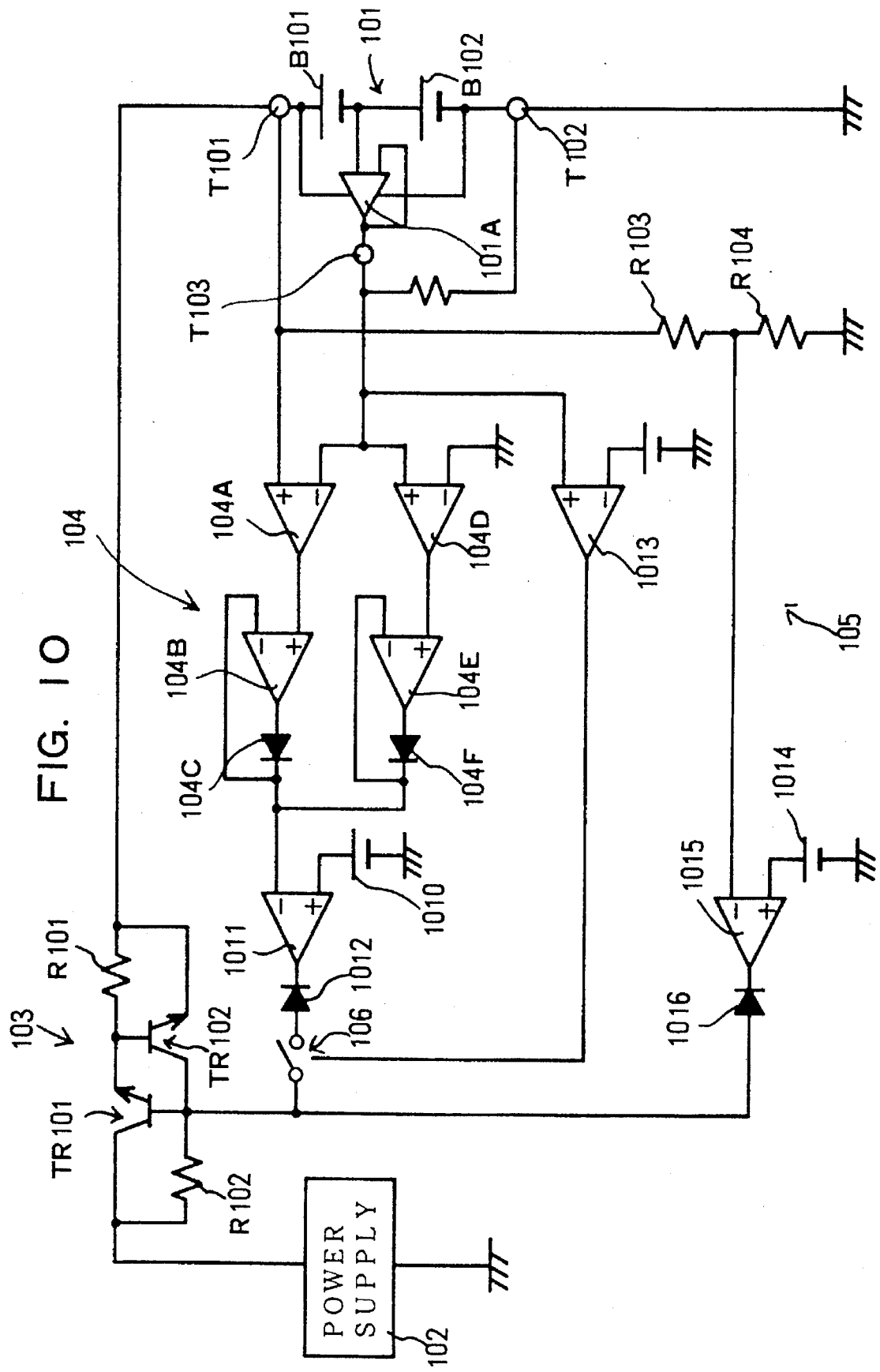
FIG. 10 is a circuit diagram showing the battery charging circuit of the sixth embodiment of the present invention.

FIG. 10 shows the sixth embodiment of the present invention. It has slight differences from the fifth embodiment of FIG. 8 in the configuration of the first constant voltage charging circuit 104, the second constant voltage charging circuit 105, and the switching device 106. Specifically, the outputs from the diodes 104C and 104F of the first constant voltage charging circuit 104 do not go to the switching device 106, but rather input to the (−) terminal of op-amp 1011. Further, the second constant voltage charging circuit 105 has separate components from the first constant voltage charging circuit 104. Namely, the second constant voltage charging circuit 105 is provided with reference voltage device 1014, op-amp 1015, and diode 1016. In addition, the diode 1016 of the second constant voltage charging circuit 105 is directly connected to the base of transistor TR101, and the diode 1012 of first constant voltage charging circuit 104 is connected to the base of transistor TR101 through the switching device 106.

When this charging circuit charges a three terminal battery pack 101, the comparator 1013 detects battery voltage output from the voltage detection terminal T103, and causes the switching device 106 to be connected. Consequently, charging current is regulated by the first constant voltage charging circuit 104 to keep the voltage oF each rechargeable battery B101 and B102 from exceeding the reference voltage (E) in the same manner as the previous embodiment. Simultaneously, charging current is also regulated by the second constant voltage charging circuit 105 to keep the overall battery voltage from exceeding the prescribed voltage (2E).

In other words, charging current is regulated (by double regulation) to keep the voltage of each rechargeable battery B101 and B102 and the overall voltage of both batteries from exceeding the reference voltage (E) and the prescribed voltage (2E) respectively.

On the other hand, in the case of charging a two terminal battery pack or in the case of charging a three terminal battery pack when for some reason battery voltage is not output from the voltage detection terminal T103, charging current is regulated by the second constant voltage charging circuit 105 to keep the overall voltage of the rechargeable batteries B101 and B102 from the prescribed voltage (2E) in the same fashion as the fifth embodiment.

Figure 11:
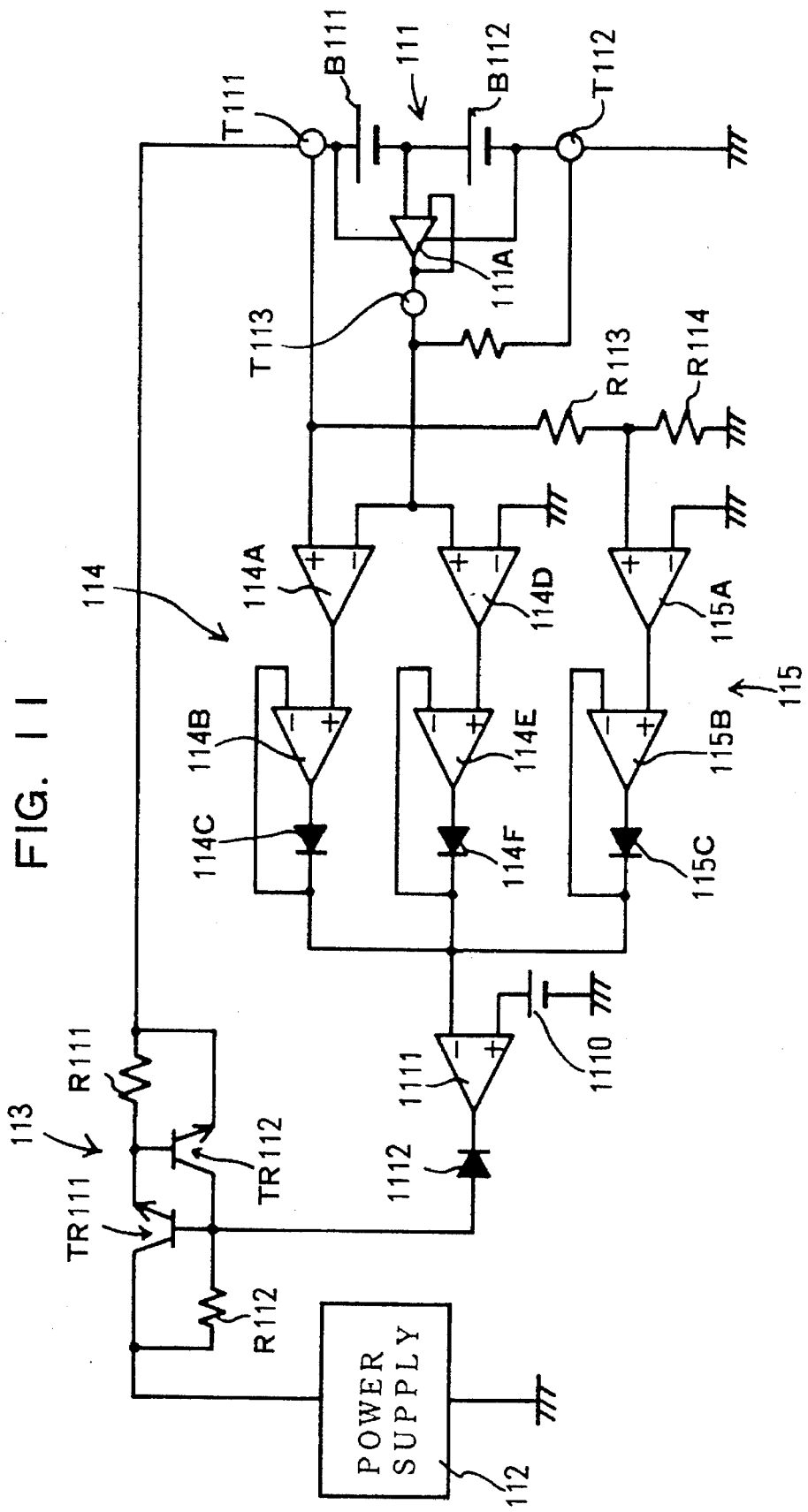
FIG. 11 is a circuit diagram showing the battery charging circuit of the seventh embodiment of the present invention.

FIG. 11 shows the seventh embodiment of the present invention. It has slight differences from the sixth embodiment of FIG. 10 in the configuration of the second constant voltage charging circuit 105, and the switching device 106. The second constant voltage charging circuit 115 is provided with two stages of op-amps 115A and 115B, to amplify the voltage from the voltage divider resistors R113 and R114, and a diode 115C. The output from the diode 115C is directly input to the op-amp 1111. The diode 1112 is directly connected to the base of transistor TR111.

When this circuit charges a three terminal battery pack 111, charging current is regulated by the first constant voltage charging circuit 114 to keep the voltage of each rechargeable battery B111 and B112 from exceeding the reference voltage (E) in the same manner as the fifth embodiment. Simultaneously, charging current is also regulated by the second constant voltage charging circuit 115 to keep the overall battery voltage from exceeding the prescribed voltage (2E).

On the other hand, in the case of charging a two terminal battery pack or in the case of charging the three terminal battery pack 111 when for some reason battery voltage is not output from the voltage detection terminal T113, charging current is regulated by the second constant voltage charging circuit 115 to keep the overall voltage of the rechargeable batteries B111 and B112 from exceeding the prescribed voltage in the same fashion as the fifth and sixth embodiments.

Figure 12:
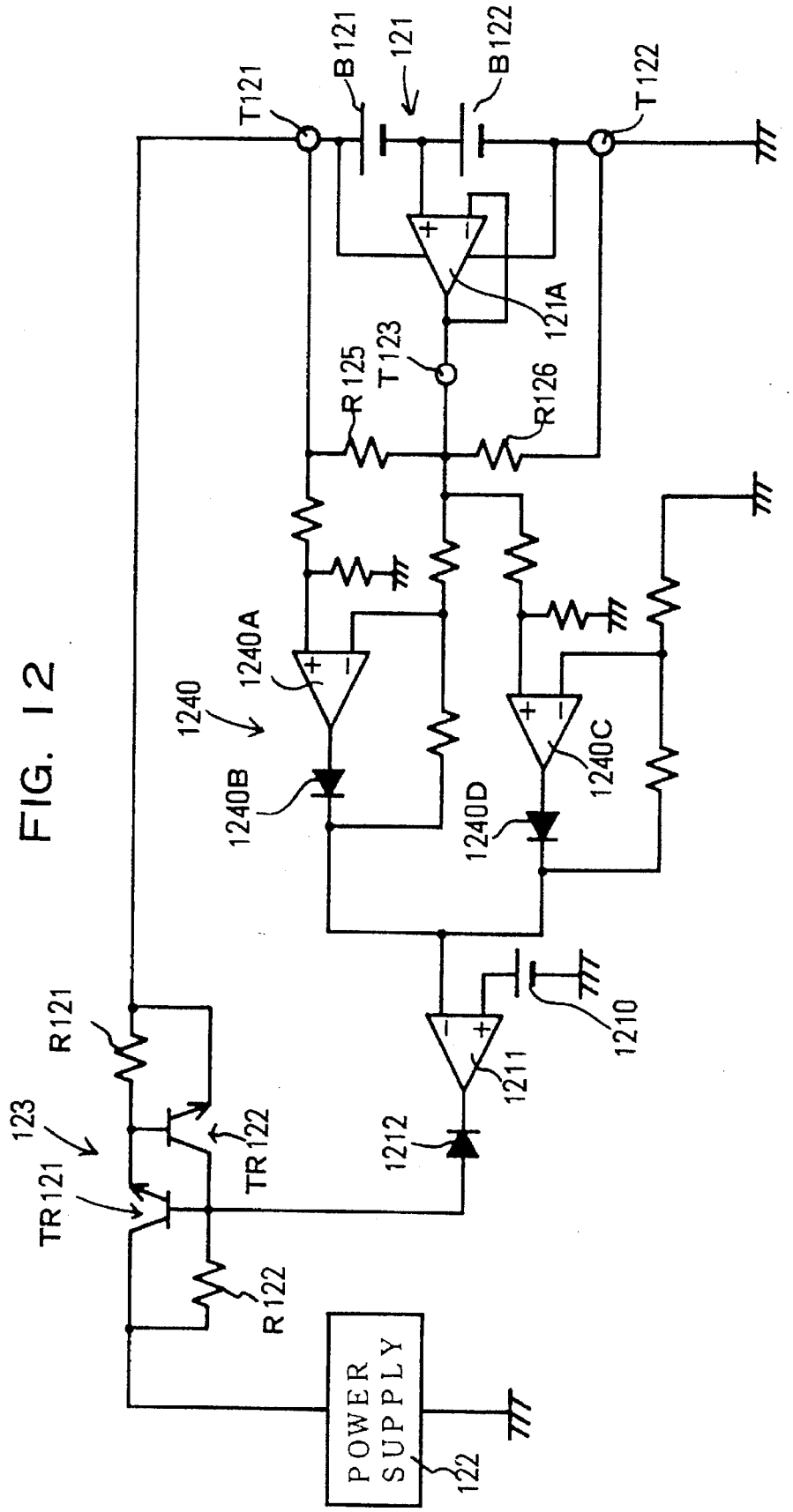
FIG. 12 is a circuit diagram showing the battery charging circuit of the eighth embodiment of the present invention.

FIG. 12 shows the eighth embodiment of the present invention. In this embodiment, the first constant voltage charging circuit 114 and the second constant voltage charging circuit 115 of FIG. 11 are configured as one constant voltage charging circuit 1240 with circuit simplification employed.

The constant voltage charging circuit 1240 is provided with two series connected resistors R125 and R126 (of equal resistance value) between the charging terminals T121 and T122 of the rechargeable batteries B121 and B122. In the case of the three terminal battery pack 121 shown in the figure, the connection midpoint between the two resistors R125 and R126 is connected to the output terminal T123 of a buffer 121A.

The constant voltage charging circuit 1240 is provided with a diode 1240B and an op-amp 1240A that amplifies the voltage across resistor R125, namely the voltage of rechargeable battery B121, and is provided with a diode 1240D and an op-amp 1240C that amplifies the voltage across resistor R126, namely the voltage of rechargeable battery B122. The outputs of the diodes 1240B and 1240D are applied to the input terminals of op-amp 1211.

When this circuit charges a three terminal battery pack 121, the voltage of each rechargeable battery B121 and B122 is detected by op-amp 1240A and 1240B respectively of the constant voltage charging circuit 1240 and input to op-amp 1211. Consequently, charging current is regulated to keep each battery voltage from exceeding the reference voltage (E) in the same manner as the previous embodiment.

On the other hand, in the case of charging a two terminal battery pack or in the case of charging the three terminal battery pack 121 when for some reason battery voltage is not output from the voltage detection terminal. T123, the op-amps 1240A and 1240B both detect half of the total voltage of the rechargeable batteries B121 and B122. Consequently, charging current is regulated to keep the overall voltage off the rechargeable batteries B121. and B122 from exceeding the prescribed voltage in the same fashion as the previous embodiments.

Figure 13:
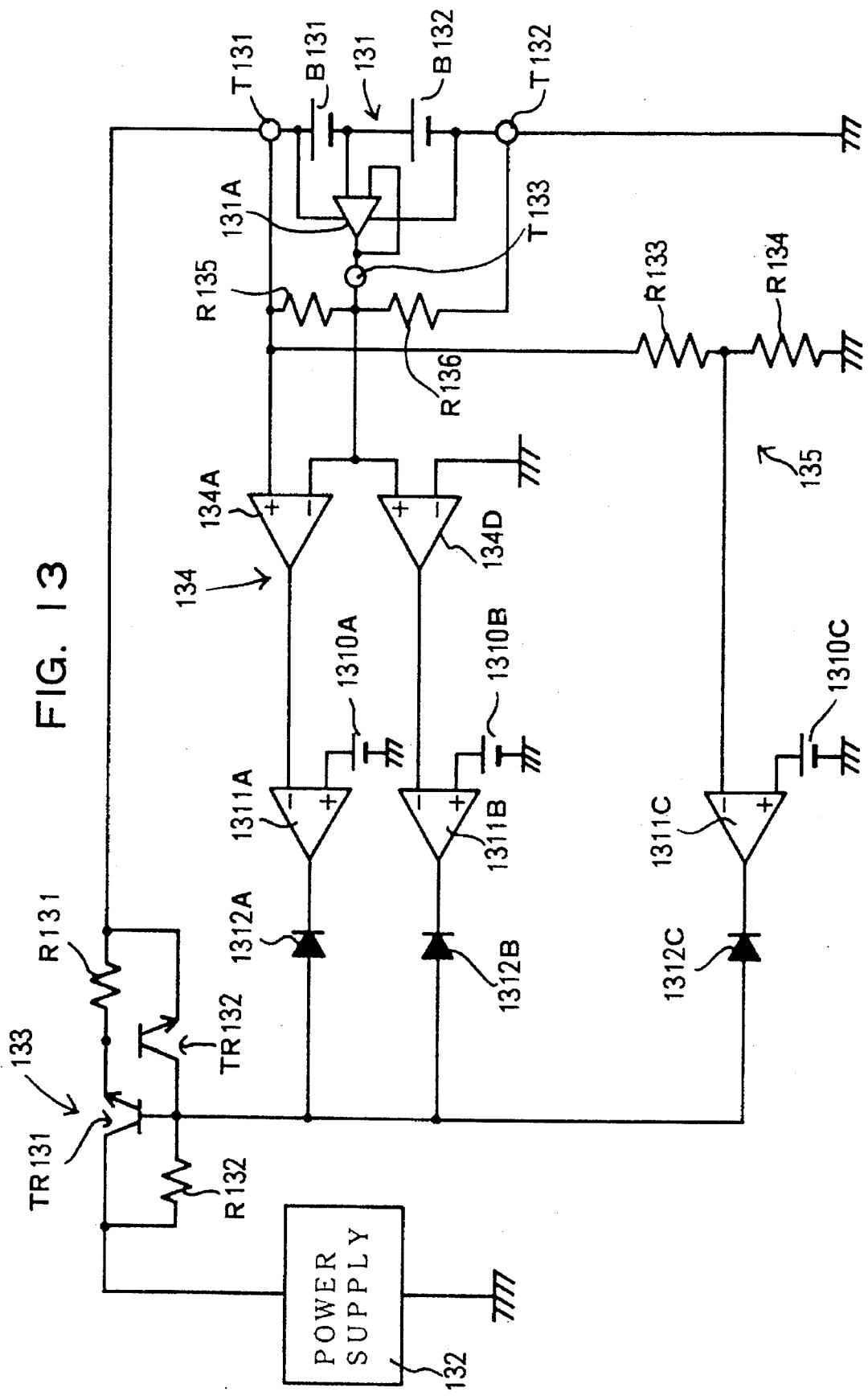
FIG. 13 is a circuit diagram showing the battery charging circuit of the ninth embodiment of the present invention.

FIG. 13 shows the ninth embodiment of the present invention. It has a first constant voltage charging circuit 134 configured similar to that of the eighth embodiment. The first constant voltage charging circuit 134 is made up of resistors R135 and R136, op-amps 134A and 134D that detect the voltage across each resistor R135 and R136 that is the voltage of each rechargeable battery B131 and B132, op-amps 1311A and 1311B that separately compare the outputs from op-amps 134A and 134D with the voltage (E) of reference voltage devices 1310A and 1310B, and diodes 1312A and 1312B. The second constant voltage charging circuit 135 is made up of voltage dividing resistors R133 and R134 that divides the total voltage across both rechargeable batteries B131 and B132 in half, op-amp 1311C that compares the output of the voltage divider with the voltage (E) of the reference voltage device 1310C, and diode 1312C.

This charging circuit controls charging in the same fashion as the previously described seventh embodiment. Namely, when this circuit charges a three terminal battery pack 131, charging current is regulated by the first constant voltage charging circuit 134 to keep the voltage of each rechargeable battery B131 and B132 from exceeding the reference voltage (E). Simultaneously, charging current is also regulated by the second constant voltage charging circuit 135 to keep the overall battery voltage from exceeding the prescribed voltage (2E).

On the other hand, when the individual voltages of the rechargeable batteries B131 and B132 cannot be detected, charging current is regulated under the control of the second constant voltage charging circuit 135 to keep the total voltage across both rechargeable batteries B131 and B132 from exceeding the prescribed voltage.

As described above, when a plurality of series connected rechargeable batteries are charged, normal charging is performed until any of the batteries reaches a prescribed voltage. After any battery reaches the prescribed voltage, charging current is regulated to keep the voltage of each battery from exceeding the prescribed voltage. Therefore, each battery can be fully charged without any battery's voltage becoming abnormally high and without causing performance degradation due to secondary reactions.

Further, even in the case when individual battery voltages cannot be detected, charging is controlled to keep the overall battery voltage from exceeding a prescribed voltage. Therefore, even in this case, the batteries can be charged without inviting abnormal battery degradation. Consequently, series connected batteries in which the individual battery voltages can be detected as well as those in which the individual battery voltages cannot be detected can both be charged with suitably regulated charging current making for more general purpose battery charging.

In the previously described battery pack charging (and discharging) methods that detect individual rechargeable battery voltages, it is possible for the rechargeable batteries to be charged or discharged through the detection terminals provided for individual rechargeable battery voltage detection in other words, a detection terminal intended to prevent over-charging (and over-discharging) may operate as a charging or discharging terminal of a rechargeable battery, and instead introduce variation between individual rechargeable batteries.

This problem can be solved by connecting a control means between each rechargeable battery's connection point and its detection terminal to restrict rechargeable battery charging or discharging. The control means may not only be a means of decreasing charging or discharging through the detection terminal, but may also be n means of essentially (or completely) preventing charging or discharging through the detection terminal. An op-amp or a high value resistor can be used as the control means.

Figure 14:
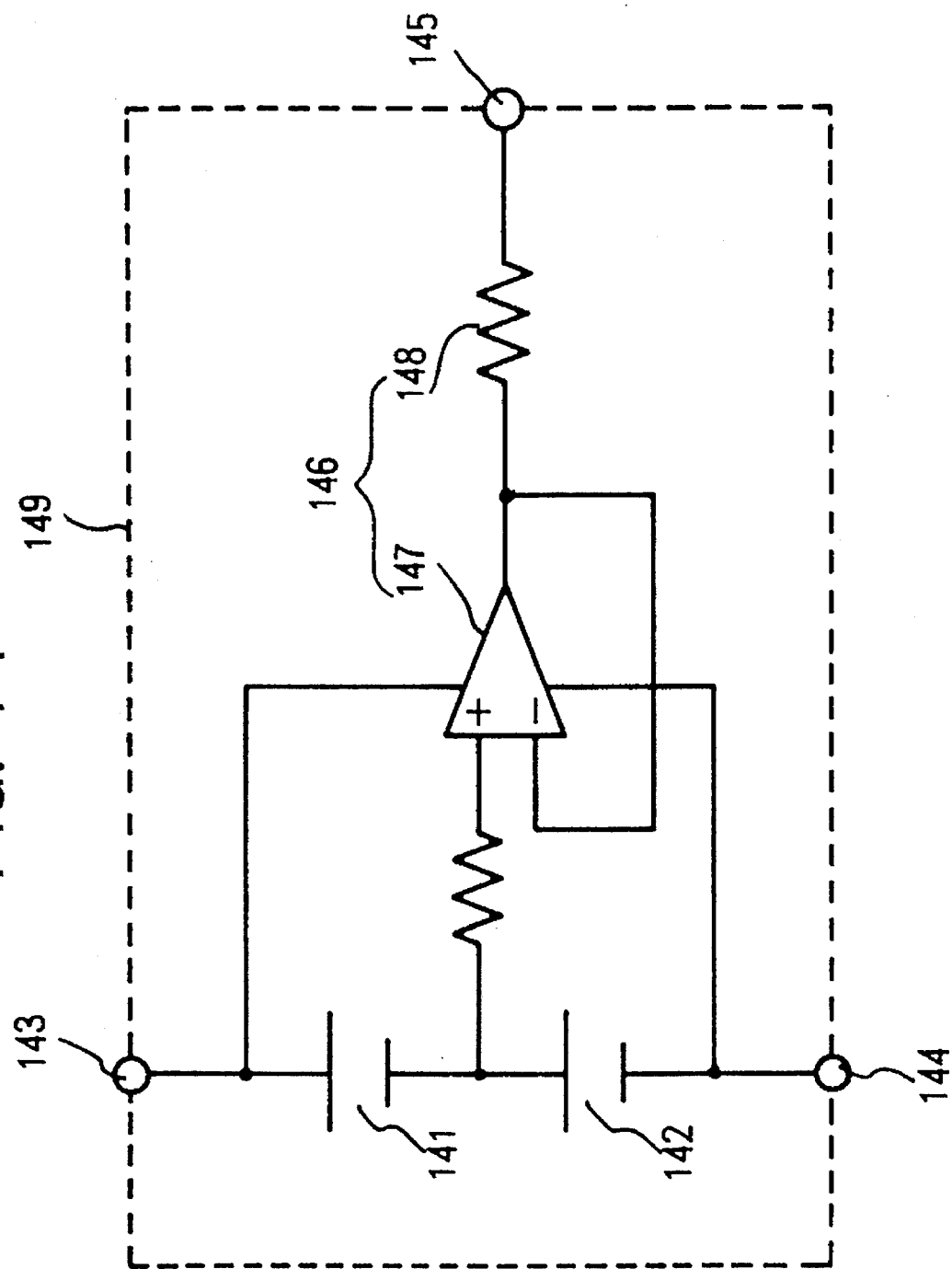
FIG. 14 is a circuit diagram showing the first embodiment of the battery pack of the present invention.

FIG. 14 shows a circuit diagram of the first embodiment of a battery pack using an op-amp and a high valued resistor as a control means. In this figure, 141 and 142 are two series connected rechargeable batteries, 143 and 144 are a pair of positive and negative charging and discharging terminals provided at both ends of the two rechargeable batteries 141 and 142 for charging and discharging those batteries, 145 is a voltage detection terminal emanating from the connection point of the two rechargeable batteries 141 and 142 for detecting their individual battery voltages, and 146 is a charging and discharging control means provided between the connection point of the two rechargeable batteries 141 and 142 and the voltage control terminal 145. The control means 146 is an op-amp 147 and a high value (for example, 10K $\Omega$) resistance device 148 connected in series. The non-inverting input terminal of the op-amp 147 is connected to the connection point between the rechargeable batteries 141 and 142. The op-amp 147 uses the voltage output by the series connection of rechargeable batteries 141 and 142 for its power supply. 149 is the battery case that contains the rechargeable batteries 141 and 142 and the charging and discharging control means 146, and exposes the charging terminals 143 and 144 arid the voltage detection terminal 145 to the outside.

By connecting a battery charger (not shown in FIG. 14) to the charging and discharging terminals 143 and 144, the rechargeable batteries 141 and 142 of the battery pack of this circuit are charged. During charging, the voltage between the positive charging terminal 143 and the voltage detection terminal 145 (namely the voltage of the rechargeable battery 141) and the voltage between the voltage detection terminal 145 and the negative charging terminal 144 (namely the voltage of the rechargeable battery 142) are detected, and if either voltage reaches the halt charging voltage, charging of the rechargeable batteries 141 and 142 is halted.

Further, when a load is connected to the charging and discharging terminals 143 and 144, the rechargeable batteries 141 and 142 discharge. Similarly during discharging, the voltage between the positive charging terminal 143 and the voltage detection terminal 145 (namely the voltage of the rechargeable battery 141) and the voltage between the voltage detection terminal 145 and the negative charging terminal 144 (namely the voltage of the rechargeable battery 142) are detected, and if either voltage reaches the halt discharging voltage, discharging of the rechargeable batteries 141 and 142 is halted.

In charging and discharging in this fashion, the input impedance of the op-amp 147 is extremely large, and the current loss at the non-inverting input terminal is essentially equal to zero.

Even if external voltage is applied to the voltage detection terminal 145, current from the voltage detection terminal 145 will be limited by the high resistance device 148 and then will flow to the charging and discharging terminal 144 (namely to ground) through the op-amp 147. Further, even if the charging and discharging terminal 144 and time voltage detection terminal 145 are shorted, current will flow from the charging and discharging terminal 143 through the op-amp 147 or the high resistance device 148. In either case, current flow will not develop into or out of the connection point between the rechargeable batteries 141 and 142.

Voltage variation in the rechargeable barrettes 141 and 142 does not develop due to the op-amp 147 because the power supply for op-amp 147 is taken from the total voltage across both rechargeable batteries 141 and 142.

Consequently, charging or discharging of the rechargeable batteries 141 and 142 through the voltage detection terminal 145 does not occur, and variation in rechargeable battery 141 and 142 voltage due to the voltage detection terminal 145 is prevented.

As described above, the input impedance of the op-amp 147 is extremely high and current loss into the non-inverting input terminal is essentially zero. However, to guarantee small current loss, high value bleeder resistor devices (for example, 10M Ω) can be connected in parallel with each rechargeable battery 141 and 142.

Figure 15:
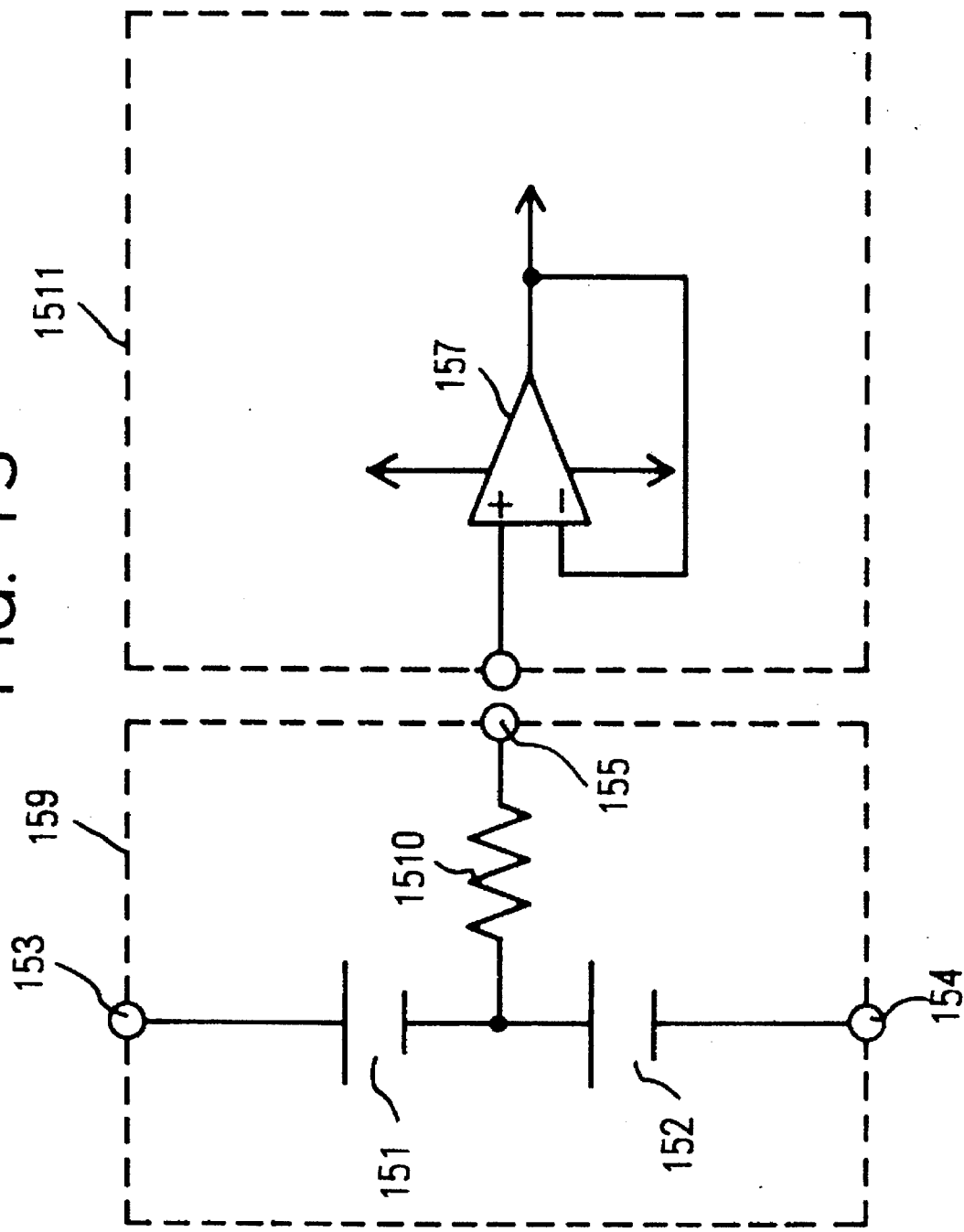
FIG. 15 is a circuit diagram showing the second embodiment of the battery pack of the present invention.

FIG. 15 is a circuit diagram showing the second embodiment of a battery pack. In this embodiment, the charging and discharging control means is made up of a high value resistive device 1510 (for example, 100K Ω). This battery pack is different than the first embodiment in that the op-amp 157 that connects to the voltage detection terminal 155 is contained in the battery charger (or load) 1511.

In this configuration as well, charging and discharging of the rechargeable batteries 151 and 152 through the voltage detection terminal 155 and variation in rechargeable battery 151 and 152 voltage due to the voltage detection terminal 155 is suppressed by the presence of the high value resistive device 1510.

Further, since the op-amp 157 is contained in the battery charger (or load) 1511, the rechargeable batteries 151 and 152 are not used as a power supply for the op-amp 157 in this embodiment. Consequently, depletion of the capacity of the rechargeable batteries 151 and 152 due to powering the op-amp 157 can be prevented.

Figure 16:
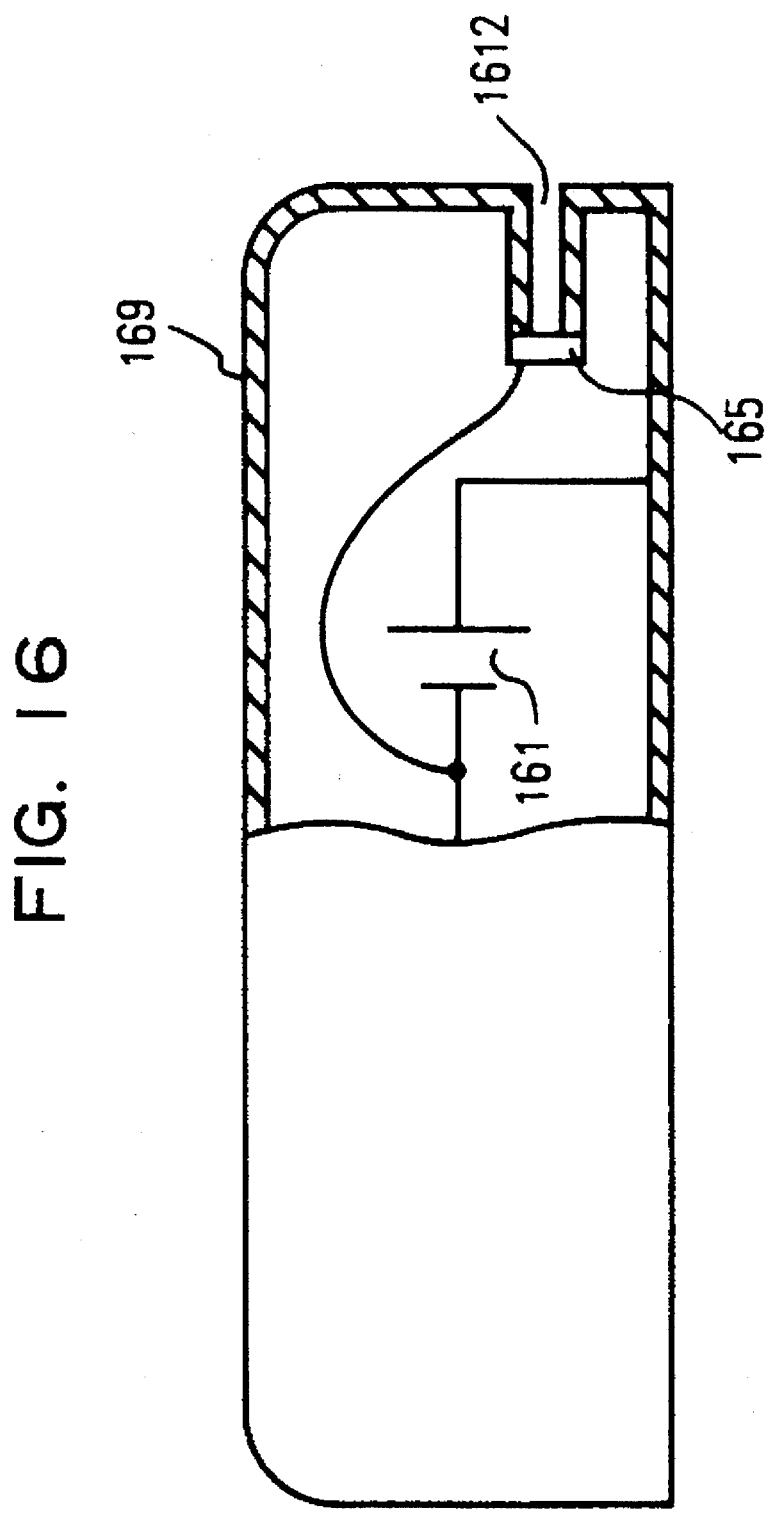
FIG. 16 is a cross-sectional view showing important parts of the third embodiment of the battery pack of the present invention.

FIG. 16 is a cross-sectional view showing important parts of the third embodiment of a battery pack. In this embodiment, a cavity 1612 is formed in one side-wall of the battery case 169, and the voltage detection terminal 165 is exposed deep within this cavity 1612. Therefore, inadvertent discharge from this voltage detection terminal 165 is prevented by avoiding contact of some non-prescribed discharging body (for example, a metal necklace).

Further, the voltage detection terminal 165 and the charging and discharging terminals are disposed in an isolated fashion. Specifically, it is desirable to arrange the voltage detection terminal on a different surface of the battery case 169 than the charging and discharging terminals.

When the voltage of each rechargeable battery is detected to control charging of a battery pack with a control means connected to the voltage detection terminal, charging and discharging from the voltage detection terminal, for detecting individual rechargeable battery voltages, can be suppressed. Therefore, rechargeable battery charging and discharging can be suitably controlled.

As this invention may be embodied in several forms without departing from the spirit of essential characteristics thereof, the present embodiment is therefore illustrative and not restrictive, since the scope of the invention is defined by the appended claims rather than by the description preceding them and all changes that fall within meets and bounds thereof are therefore intended to be embraced by the claims.

We claim:

1. A rechargeable battery charging method comprising:
   (a) effecting a first charging of a plurality of series connected rechargeable batteries, said first charging being a constant current charging,
   (b) detecting a battery voltage of each one of said rechargeable batteries during said first charging, wherein said first charging is performed until the battery voltage of any one of the rechargeable batteries is detected as reaching a prescribed voltage, and
   (c) after the battery voltage of any one of the rechargeable batteries reaches the prescribed voltage, effecting a second charging of the plurality of series connected rechargeable batteries by gradually reducing a battery charging current to maintain the battery voltage of said any one of the rechargeable batteries at the prescribed voltage and to gradually increase the battery voltage of each of the remaining rechargeable batteries without exceeding the prescribed voltage.

2. A rechargeable battery charging method as recited in claim 1, wherein said first and second chargings are effected to a plurality of series connected nonaqueous rechargeable batteries.

3. A rechargeable battery charging method as recited in claim 2, wherein said first and second chargings are effected to a plurality of series connected lithium ion rechargeable batteries.

4. A rechargeable battery charging method as recited in claim 1, wherein said plurality of series connected rechargeable batteries are contained within a battery pack which is detachably connectable to a battery charger, and wherein said method further comprises automatically detecting a total battery voltage of the rechargeable batteries in response to the battery pack being connected to the battery charger and then controlling charging to keep the total battery voltage from exceeding a prescribed total voltage.

5. A rechargeable battery charging apparatus comprising:
   (a) a detection means for detecting a battery voltage of each one of a plurality of rechargeable batteries which are connected together in series, wherein said the detection means is a constant voltage charging circuit that prevents the battery voltage of each battery from exceeding the prescribed voltage, and
   (b) a control means, responsive to said detection means, for charging the rechargeable batteries by gradually reducing a battery charging current to maintain the battery voltage of said any one of the rechargeable batteries at the prescribed voltage and to gradually increase the battery voltage of each of the remaining rechargeable batteries without exceeding the prescribed voltage when the battery voltage of said any one of the rechargeable batteries is detected as reaching the prescribed voltage, wherein said control means is a constant current charging circuit that control the battery charging current in accordance with a signal output from said constant voltage charging circuit.

6. A rechargeable battery charging apparatus as recited in claim 5, wherein said rechargeable battery charging apparatus is connected to a voltage detection terminal of a battery pack containing said rechargeable batteries and further includes means for controlling a current flowing into and out of said voltage detection terminal.

7. A rechargeable battery charging apparatus as recited in claim 6, wherein said battery charger includes an operational amplifier having an input connected to said rechargeable batteries and an output connected to said voltage detection terminal.

8. A rechargeable battery charging apparatus as recited in claim 6, wherein said battery charger includes a high resistance device connected between said rechargeable battery and said detection means.

9. A rechargeable battery charging apparatus as recited in claim 6, wherein said battery charger includes an operational amplifier and a high resistance device connected between said rechargeable battery and said detection means.

10. A rechargeable battery charging apparatus as recited in claim 5, wherein said constant voltage charging circuit includes operational amplifiers that respectively compare the battery voltage of each rechargeable battery with a reference voltage, and wherein outputs of the operational amplifiers control said constant current charging circuit.

11. A rechargeable battery charging apparatus as recited in claim 5, wherein said constant voltage charging circuit includes shunt regulator integrated circuits controlled by the battery voltage of each of the rechargeable batteries, and and wherein outputs of said shunt regulator integrated circuits control said constant current charging circuit.

12. A rechargeable battery charging apparatus as recited in claim 5, wherein (a) said control means is a constant current charging circuit, and (b) said detection means is said voltage detection circuit that detects the battery voltage of each of the rechargeable batteries and a micro-computer that processes an output from said voltage detection current and controls said constant current charging circuit.

13. A rechargeable battery charging apparatus as recited in claim 5, wherein said plurality of series connected rechargeable batteries are contained within a battery pack which is detachably connectable to a battery charger, and wherein said apparatus further comprises a second detection means for automatically detecting a total battery voltage of the rechargeable batteries in response to said battery pack being connected to said battery charger and a second control means for then controlling charging to keep the total battery voltage from exceeding a prescribed total voltage when said second detection means detects that the total battery voltage has reached the prescribed total voltage.

14. A rechargeable battery charging apparatus as recited in claim 13, wherein said control means and said second control means are a constant current charging circuit, wherein said detection means is a first constant voltage charging circuit, and wherein said second detection means is a second constant voltage charging circuit.

\* \* \* \* \*